United States Patent
Kamphake

[11] 3,796,543
[45] Mar. 12, 1974

[54] AUTOMATIC ANALYSIS FOR PHOSPHOROUS CONTENT

[75] Inventor: Lawrence J. Kamphake, Cincinnati, Ohio

[73] Assignee: The United States of America as represented by the Administrator of the Environmental Protection Agency, Washington, D.C.

[22] Filed: Feb. 7, 1972

[21] Appl. No.: 224,016

[52] U.S. Cl. .............................. 23/230 R, 23/253 R
[51] Int. Cl. ........................................... G01n 21/28
[58] Field of Search ...................... 23/230 A, 253 A

[56] References Cited
UNITED STATES PATENTS

| | | | |
|---|---|---|---|
| 3,479,142 | 11/1969 | Isreeli et al. | 23/230 X |
| 3,547,586 | 12/1970 | Denney et al. | 23/230 |
| 3,572,994 | 3/1971 | Hochstrasser | 23/230 |
| 3,690,833 | 9/1972 | Ferrari | 23/230 |

OTHER PUBLICATIONS

Boltz et al., "Spectrophotometric Determination of Phosphorus as Molybdiphosphoric Acid," Analytical Chemistry, Vol. 20, No. 8, August 1948.

Primary Examiner—Morris O. Wolk
Assistant Examiner—R. E. Serwin

[57] ABSTRACT

A continuous automatic analytical system for measuring the phosphate content in aqueous fluids. First the phosphate containing sample is acidified, then reacted in an acid medium with molybdate to form molybdiphosphoric acid. Thereafter the molybdenum in the heteropoly acid is selectively reduced by hydrazine to a blue heteropoly complex. The quantity of blue color is directly proportional to the ortho-phosphate concentration in the sampling and a colorimeter reading thereof a measure of the phosphate content in the sample.

4 Claims, 2 Drawing Figures

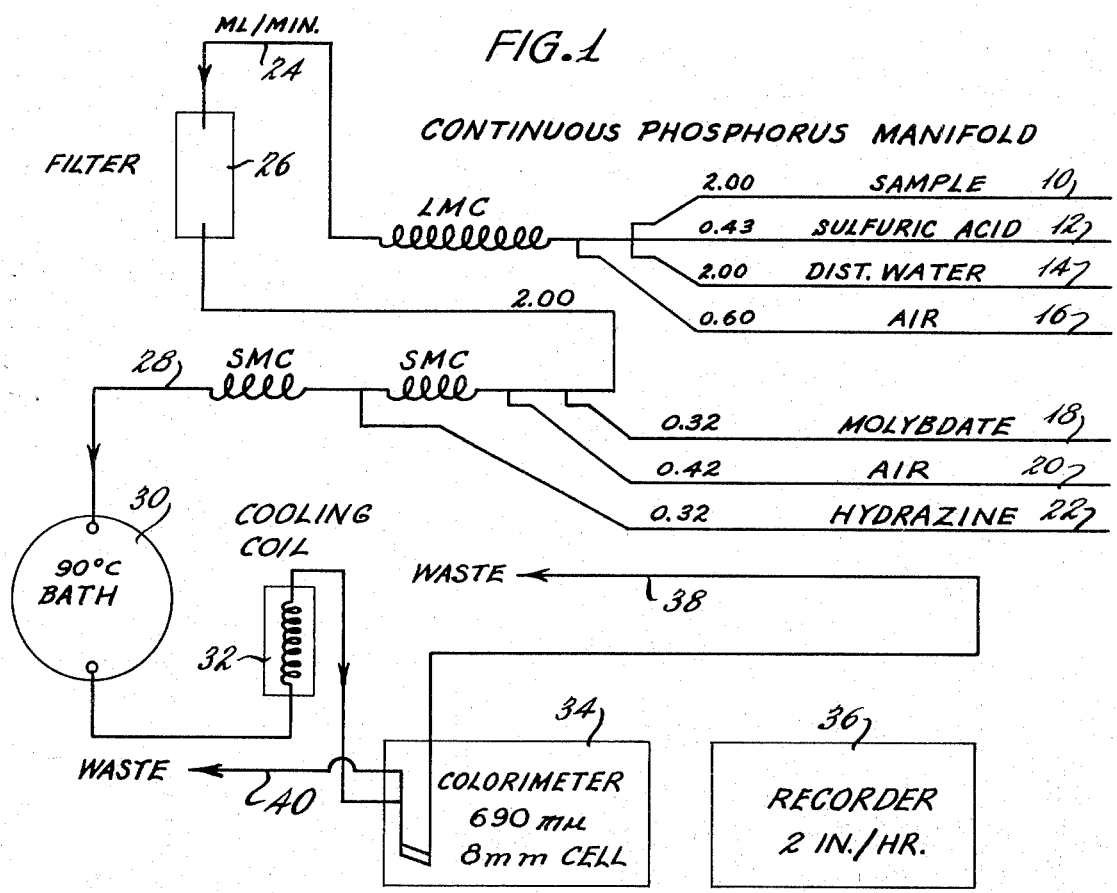
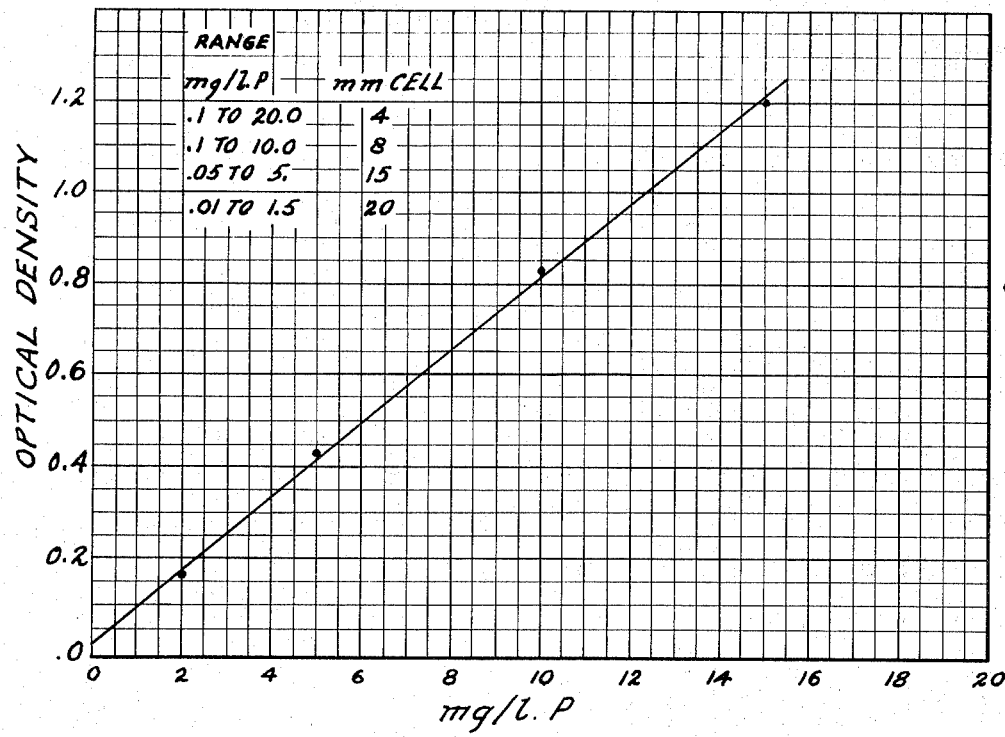

AUTOMATIC ANALYSIS FOR PHOSPHOROUS CONTENT

This invention relates to an automated analysis system for determining the phosphorous content in aqueous solution.

Since one of the major causes of eutrophication in lakes and streams is believed to be the presence therein of excessive phosphate, an ever-increasing degree of attention is being paid to the phosphate content in effluent from sewage treatment plants. However, for the most effective use of treatment procedures reducing the phosphorous content of sewage effluence, the sewage plant operator must have knowledge of the phosphorous content in the intake and effluent waters.

The object of the present invention is to provide an automated analysis system capable of monitoring the phosphate content in water.

A further object of this invention is to provide a method and apparatus for continuously monitoring the phosphate content in sewage plant effluent.

The automatic phosphorous analyzer system of the present invention is capable of on-line continuous operation and moreover, is directly applicable to process control systems. For example, the addition rate for coagulants (which aid in the removal of phosphates) can be adjusted automatically according to the phosphate measurement of this system.

The analysis technique practiced according to the present invention is based on what is known as the molybdenum-blue reaction. An ortho-phosphate reacts with molybdate in acid medium to form a molybdiphosphoric acid, a heteropoly acid. Thereafter the molybdenum in the heteropoly acid is selectively reduced with hydrazine to a blue heteropoly complex under controlled conditions. The conditions are controlled with regard to the ratio of acid to molybdate, the amount of molybdate, acidity, temperature, reaction time, and reactant concentrations. The resulting blue color is directly proportional to the ortho-phosphate concentration.

Comparable wet chemistry techniques heretofore employed such as for example, stannous chloride or ascorbic acid reduction, are not believed well adapted to an automatic analysis system. The stability of the reagents was poor, precipitation occurred resulting in relatively unstable analytic systems, and in particular, a drift in the recorder baseline. The chemistry of the present hydrazine reduction analytic system is believed to be superior, and the superiority is attributed largely to the use of hydrazine sulfate as the reducing agent; reduction with hydrazine sulfate eliminates precipitation within the system.

For further understanding of the present invention, reference is now made to the attached drawing wherein:

FIG. 1 is a flow-sheet for the continuous phosphorous manifold;

FIG. 2 is an exemplary standardization curve.

Referring now to FIG. 1, wherein the continuous phosphorous manifold is illustrated diagrammatically, it may be noted that the actual equipment modules are commercially available equipment (i.e., Auto Analyzer) and the drawing illustration corresponds to the manner in which analytical set-ups normally are illustrated for and by the users of such equipment. Additionally, the flow-sheet of FIG. 1 provides by way of specific example representative relative quantities of sample and reagents passing through the system; the numerical values are in ml/min.

The sample, sulfuric acid and distilled water, entering their respective transmission lines 10, 12 and 14 are manifolded together by the usual proportioning pump (not shown). The successive pulses thereof are separated by an air bubble from line 16. The admixed fluids travel through line 24 past a large mixing coil (LMC), then through a filter 26. Filter 26 serves to remove any sediment present in the acidified sample. The air bubble separation of successive sample pulses is upset by passage through filter 26, since the air is removed at filter 26, causing the acidified sample to leave filter 26 by way of line 28 as a continuous stream.

Ammonium molybdate, air and hydrazine sulfate from lines 18, 20 and 22 are pulsed into the acidified sample containing line 28 in that order. A small mixing coil (SMC) serves to mix the sample and molybdate, and another small mixing coil mixes the hydrazine into the sample. The proportioning pump is set, of course, to introduce the hydrazine directly into the liquid sample pulse. In any event, the combined fluid passes into and through a controlled temperature bath 30 (set for example, at 90°C.) with the path of travel therein (e.g., 20 feet of tubing) predetermined to provide a sufficient time delay to complete therein the desired reduction reaction of the heterpoly acid to molybdenum blue.

Thereafter the sample passes through cooling coil 32 into a standard colorimeter 34 wherein the color intensity is read and recorded by recorder 36 (indicated diagrammatically) which continuously records the color reading and therefore indicates the phosphate content in the original sample. The recorded liquid waste stream leaves via line 38 and the balance of the waste stream leaves via line 40.

The calibration curve for the colorimeter is shown in FIG. 2.

Allusion has already been made as to the direct applicability of the continuous phosphorus manifold of the present invention for analysis of sewage plant effluent. The analysis is accurate for ortho-phosphate for sure, but as yet has not been established conclusively for other forms of phosphates which may be present in the sample, such as for example, the tripolyphosphate commonly used in most detergent formulations. Since the chemical and biologic reactions which take place in sewage disposal plants serve to convert most, e.g., 95 percent, of the phosphate originally present in the incoming sewage to the ortho-phosphate form, placement of the continuous phosphorous manifold on the sewage effluent line provides accurate analysis of the effluent. The colorimeter or recorder can be hooked to the control means of a phosphate removal procedure forming part of the sewage plant (or which might be a subsequent treatment of the effluent) that reduces the effluent phosphate level to acceptable values.

The continuous phosphorous manifold of the present invention is not limited to monitoring only the effluent of sewage plants. The initial admixture of the sample with acid will cause reactions which convert other forms of dissolved phosphate to the ortho-phosphate form before the acidified sample reaches that portion of the manifold where the ammonium molybdate is added. Accordingly, practice of the present invention also contemplates use of the continuous phosphorous to also monitor sewage intake to the sewage disposal plant for its inorganic phosphorous content.

The above description of practice according to this invention has been in terms of sample acidification with sulfuric acid. Other phosphorous-free mineral acids may be employed in lieu thereof, including for example, hydrochloric and nitric acids.

For further elucidation of the present invention and the practice thereof, the following detailed description of reagent preparation and use in the analytic system is presented.

The sulfuric acid reactant desirably is 4.5 N. A sufficient quantity for 2–3 weeks of operation of the continuous phosphorus manifold (in the Auto Analyzer version illustrated) can be made by adding 1,250 ml of pure concentrated (36 N) sulfuric acid to approximately 8 liters of distilled water. Then, after cooling, further dilution is made with distilled water to a total of 10 liters.

The ammonium molybdate solution can be made by adding 35.0 gms of ammonium molybdate, $(NH_4)_6 MO_7 O_{24} \cdot 4H_2O$ to 10.0 liters of water with stirring until complete dissolution. This quantity should be sufficient for 3 weeks of operation.

The hydrazine sulfate solution may be made to adding 10 gms of hydrazine sulfate, $(NH_2)_2 \cdot H_2SO_4$ to 10.0 liters of distilled water with stirring until complete dissolution has been obtained. This quantity should be sufficient for 3 weeks of operation. Importantly, this reagent is stable for more than 6 months.

Approximately 20 liters of distilled water (phosphorous-free) is required for 1 week of operation.

The phosphorous stantard (1,000 mg/l) can be made by dissolving 4.3940 gms of anhydrous $KH_2PO_4$ in distilled water and then diluting to a total volume of 1,000 ml. More dilute working standards may be made according to the following table:

| mg/l worked | ml of stock diluted to 1,000 ml |
|---|---|
| 0.5 | 0.5 ml |
| 2.0 | 2.0 ml |
| 6.0 | 6.0 ml |
| 10.0 | 10.0 ml |

In terms of setting up and operating the continuous phosphorous manifold on the Auto Analyzer for monitoring the effluent of a waste sewage plant, it may be noted that the motor on the filter can be slowed down if it is desired to have a single roll of filter paper (500 feet) last longer than a week. All parts of the filter which come into contact with the acidified sample should be coated for protection against the acid environment. During the course of continuous operation the fluid transmission lines may become cloudy due to deposition of solids therein. Should this happen, the lines should be washed out with 1 percent EDTA (ethylene diamine tetra acetic acid) in 1 N sodium hydroxide solution for approximately 15 minutes, and thereafter, rinsed with distilled water, following which continuous operation can be resumed again. The suggested 15 minutes wash approximately coincides with the travel time of a sample through the analytic system.

What is claimed is:

1. An automated method for measuring the phosphorous content in an aqueous liquid sample which comprises:
   a. combining a stream of sample with a stream of phosphorous-free mineral acid,
   b. thereafter adding ammonium molybdate to the stream of acidified sample whereby a heterpoly molybdiphosphoric acid is formed in the stream,
   c. then adding hydrazine to the stream and reacting the hydrazine with the heterpoly acid whereby a molybdenum blue results,
   d. thereafter colorimetrically measuring the blue color of the reactant mixture, said measurement constituting a measurement of the phosphorous content in the original sample.

2. The method of claim 1 wherein successive sample portions are spaced apart by flow of air introduced at pulsed intervals into the combined stream of acidified sample and molybdate, said hydrazine being introduced into the liquid pulses in timed pulses in synchronization therewith.

3. The method of claim 1 wherein the mineral acid is sulfuric acid, and the hydrazine is hydrazine sulfate.

4. The method of claim 1 wherein the sample fluid being tested comprises the effluent from a waste sewage plant.

* * * * *